US008720271B2

(12) United States Patent
Zhu et al.

(10) Patent No.: US 8,720,271 B2
(45) Date of Patent: May 13, 2014

(54) ELECTROMAGNETIC DISC DRIVE WHEEL BALANCER

(76) Inventors: Yan Zhu, Toronto (CA); Xiaoying Zhu, Toronto (CA)

( * ) Notice: Subject to any disclaimer, the term of this patent is extended or adjusted under 35 U.S.C. 154(b) by 625 days.

(21) Appl. No.: 12/694,001

(22) Filed: Jan. 26, 2010

(65) Prior Publication Data

US 2011/0023599 A1 Feb. 3, 2011

(51) Int. Cl.
*G01M 1/16* (2006.01)
(52) U.S. Cl.
USPC ............................................. 73/462
(58) Field of Classification Search
USPC ............................................. 73/462
See application file for complete search history.

(56) References Cited

U.S. PATENT DOCUMENTS

| | | | | |
|---|---|---|---|---|
| 3,225,235 | A | * | 12/1965 | Lee ................................ 310/268 |
| 4,423,632 | A | * | 1/1984 | Madden et al. .................. 73/462 |
| 4,480,472 | A | | 11/1984 | Wood |
| 4,502,328 | A | | 3/1985 | Wood et al. |
| 6,439,049 | B2 | | 8/2002 | Colarelli, III et al. |
| 6,546,635 | B1 | | 4/2003 | Gerdes et al. |
| 6,799,460 | B1 | | 10/2004 | Parker et al. |
| 6,854,329 | B2 | | 2/2005 | Colarelli, III et al. |
| 7,574,913 | B2 | | 8/2009 | Gerdes et al. |
| 7,584,659 | B1 | * | 9/2009 | Rogers et al. .................... 73/462 |
| 2003/0213301 | A1 | * | 11/2003 | Buzzi .............................. 73/462 |

* cited by examiner

*Primary Examiner* — John Chapman, Jr.
(74) *Attorney, Agent, or Firm* — Eugene Gierczak

(57) ABSTRACT

A device to balance a disc, comprising a shaft disposed for rotation about an axis having one end adapted to coaxially receive the disc and an opposite end including rotor structure stator structure to magnetically drive the rotor structure, shaft and disc about the axis; and structure for determining imbalance in the disc.

20 Claims, 5 Drawing Sheets

ELECTROMAGNETIC DISC DRIVE WHEEL BALANCER

FIELD OF INVENTION

This invention relates to a device to balance a disc on a rotating shaft; the disc at one end of the shaft and a rotor connected to another end of the shaft with a stator electromagnetically driving the rotor, shaft and disc about the axis and structure for determining the imbalance in the disc. The invention also relates to a method for balancing a vehicle wheel by an electromagnetic disc drive structure.

BACKGROUND TO THE INVENTION

Wheel balancers are commonly used in order to balance discs, disc shaped structures and vehicle wheels. Discs such as vehicle wheels are generally mounted to a hub connected to disc brakes or drum brakes which are generally circular in configuration. During the manufacturing process, the disc brakes or drum brakes are not manufactured perfectly round. Therefore, during rotation, the vehicle wheel will generally start to vibrate or chatter at elevated rotational speeds. This can be generally overcome by adding a weight to the vehicle wheel to minimize this vibration or chatter in a manner well-known to those persons skilled in the art. Accordingly, any rotating object or disc will produce a centrifugal force because of the asymmetric mass distribution when it rotates about its axis.

Wheel balancers are commonly used to measure imbalance values and position of a rotating object. This imbalance centrifugal force can bring on object vibration, both electrically and mechanically, as well as produce noise on mechanical vibration which can poorly affect the product's character and lifespan.

Therefore, a wheel balancer is usually used to inspect rotation object imbalance forces, including data range and position in industrial practices. Such balancing can improve the rotating object's mass distribution related to the axis and reduce vibration to the approved range so that it will improve the character of the rotation after corresponding compensation has been implemented.

Generally speaking, the principle utilized by common wheel balancers include the steps of:

Installing and fixing the imbalance object to the rotary axis of the wheel balancer;
Inputting the imbalance object's width, diameter and distance between the object and the wheel balancing machine;
Starting the wheel balancer to spin or rotate whereby during spinning an encoder and code wheel (which are generally fixed on the rotary axis) interfere to confirm the imbalance position in one or more piezoelectric devices utilized for testing imbalance values; and
Then utilizing a microprocessor in the calculation of imbalance values and position which will be displayed after the wheel balancer brakes all in the manner well known to those persons skilled in the art.

Furthermore, the main structures for common wheel balancers include:

Electric Power Drive Device—main function is drive a rotary axis;
Rotary Axis and Base of Rotary Axis—main function is to support the rotary axis and drive the imbalance object to spin;
Signal Device—usually include a pair of piezoes whose main function is getting an imbalance weight value signal of the imbalanced object or disc; a code wheel and encoder are usually utilized whose main function is getting an imbalance position signal of the imbalanced object;
Microprocessor—main function is to deal with the signal from the signal device in order to confirm imbalance, weight and position; confirm whether the power drive device is separated from the rotary axis of the wheel balancer and confirm balance type and process;
Display Device—main function is to display an imbalance weight and position in order to confirm balance type and other information;
Brake Device—main function is to break the rotary axis of the wheel balancer.

There are a variety of prior art wheel balancers in the marketplace which include the following:

1. A wheel balancer that has an AC or DC motor which drives a shaft about an axis of rotation by use of belt wheel and belt. The power to the motor is shut down when the rotating axis or its shaft rotates at a desired speed or rating speed. Examples of such traditional wheel balancers include wheel balancers available from Hofmann in Germany, CEMB in Italy and Hunter in the USA.

2. Wheel balancers with an AC or DC motor, which motor drives the rotary axis or shaft to rotate by friction between rollers or gears on the motor and the vehicle wheel through friction. The power supply to the motor is shut down when the rotary axis rotates at a desired speed or rating speed, in which event, the rotor or gear from the friction wheel to the wheel is disengaged and the rotary axes or shaft in the wheel balancer rotates by inertia. Examples of such traditional wheel balancers include wheel balancers from Corghi and Simply Faip in Italy.

3. Other traditional wheel balancers include fixing a rotor of an AC or DC motor directly on the rotary axis. The stator is outside the rotor and the motor directly drives the axis or shaft of the wheel balancer. The power supply is shut down when the rotary axes rotates at a desired or rating speed. Representative wheel balancers of this type are found through Coats in the USA.

Each of the three types of prior art wheel balancers described above include inefficiencies which effects the balancing of a vehicle wheel. For example, over time the belts utilized in the wheel balancers identified under paragraph 1 above will generally loosen after a period of usage and the balancing system will become unstable thereby reducing the precision of the balance. Moreover, wheel balancers of the type described in paragraph 2 above require complex mechanical and electro control circuits which are difficult to process and adjust. Furthermore, wheel balancers of the type described in paragraph 3 above also require complex mechanical and electronic control circuits making the process technologies and manufacturing processes, difficult and costly to operate.

There have been a number of prior art devices. For example U.S. Pat. No. 7,574,913 relates to a method for determining weight display thresholds for static and dynamic imbalances and correction weights on a rotating body such as a vehicle wheel assembly which vary with parameters of the rotating body, wheel and/or tire, and for displaying measured imbalances in relation to determine imbalance thresholds.

Another arrangement is disclosed in U.S. Pat. No. 4,502,328 which relates to a free spinning electronic wheel balancer.

Furthermore U.S. Pat. No. 4,480,472 relates to a dynamic electric wheel balancer for measuring the imbalance condition in a vehicle wheel and indicating the position and correction weights required for balancing the wheel in one or two plains. The wheel balancer contains a rotating shaft in order to make the dynamic measurements. The shaft is free-wheeling during measurement and is brought up to a predetermined minimum RPM value through a motor and clutch arrangement.

Another wheel balancer is show in U.S. Pat. No. 6,854,329.

U.S. Pat. No. 6,799,460 teaches a wheel balancer that includes a shaft adapted for receiving a wheel assembly and rotating a wheel assembly; mounted thereon with a motor connected to the shaft, rotating the shaft about its longitudinal axis, thereby rotating the wheel assembly.

Finally U.S. Pat. Nos. 6,546,635 and 6,439,049 show other wheel balancer arrangement.

It is an aspect of this invention to provide a device to balance a disc, comprising: a shaft disposed for rotation about an axis having: one end adapted to coaxially receive the disc, and an opposite end including rotor means; stator means to magnetically drive the rotor means, shaft and disc about the axis; and means for determining imbalance in the disc.

It is another aspect of this invention to provide a balancer for a wheel comprising: a frame; stator means supported by the frame; a shaft supported by the frame for rotating about an axis and having first and second axial spaced ends; a stub shaft coaxial presented at the first end for removable connection to the wheel; a rotor means coaxially connected to the second end and axially spaced from the stator means; power means associated with the stator means to generate an electromagnetic field between the stator means and the rotor means to rotate the shaft and wheel; means responsive to the rotation of the wheel for measuring and indicating imbalance of the rotating wheel.

A further aspect of this invention relates to a method for balancing a vehicle wheel connected at one end to a shaft rotating about an axis and having a rotor at the other end of said shaft comprising the steps of: powering a stator axially disposed adjacent the rotor so as to electromechanically drive the rotor, shaft and vehicle wheel about the axis of rotation.

SUMMARY OF THE INVENTION

This invention relates to a wheel balancer with an electromagnetic disc drive device. The invention described herein changes the traditional radial transmission mode to an axial transmission mode. Accordingly the rotary axis of the wheel balancer can combine with the rotor of the electro-magnetic disc drive device in a simple and practical manor.

The wheel balancer, described herein, includes a power driven unit, data processing device, a shaft having an axis of rotation, a flange and a sub-shaft. The shaft referred to above which rotates about an axis of rotation is installed on the bracket of wheel balancer. One end of the shaft is connected to the power driven unit and the other end is connected with the flange and sub-shaft in turn. The wheel balancer described herein, includes a power output device which can be chosen between:

(a) Disc single-phase or three-phase asynchronous induction motor; and
(b) Disc permanent magnet brushless DC motor, or
(c) Disc power stepper motor and other electromagnetic disc drive devices including the stator and rotor of two parts.

In particular, the stator is installed on stator brackets and connected to a frequency conversion power supply means. The rotor is fixed on an axis of rotation through the central installation hole to be described. The rotor is connected to the axis of rotation either by bonding, spleening or interference fits. The gap between the stator and the rotor ideally should be less than two millimetres although other dimensions can be utilized.

Single-phase or three-phase conversion power supply can be used as power supplies for the electro-magnetic disc drive device described herein. The power supply connects with the stator via a cable. In one example, the stator generates an axial rotary magnetic field when passing a frequency alternating current. Accordingly, the rotor rotates under the force of a rotational magnetic field and pushes or rotates the shaft about the rotary axis so as to rotate a wheel connected at the other end thereof. When the rotary shaft requires to be braked the DC of the power unit will flow into the stator of the electro-magnetic disc drive to generate a braking force on the rotor.

It can be seen from the prior art devices that the invention described herein simplifies the driving mechanism through the use of the disc magnetic drive device. Furthermore, the invention described herein removes the bulky pulley, built or rotor mechanism as well as the complex motor brackets of prior art wheel balancers. Furthermore, start-up or the braking rotor by different AC or DC from frequency conversion power supplies can minimize or eliminate the complex start-up or braking devices of the prior art wheel balancers.

Moreover, prior art devices can generate electrical static interference through their complex structures. The invention described herein minimizes the complex electronic control circuits and mechanical structures as well as the difficult and costly processing techniques and manufacturing processes of prior art balancers. Accordingly, the device itself has inherently less mechanical or electrical vibrations than the prior art.

It is an object of this invention to provide an improved wheel balancer and method of balancing wheels. These and other objects and features of the invention shall now be described in relation to the following drawings:

DRAWINGS

The following detailed description illustrates the invention by way of example and not by way of limitation. The description clearly enables one skilled in the art to make and use the invention, describes several embodiments, adaptations, variations, alternatives and uses of the invention.

DETAILED DESCRIPTION OF THE INVENTION

Figure 1:
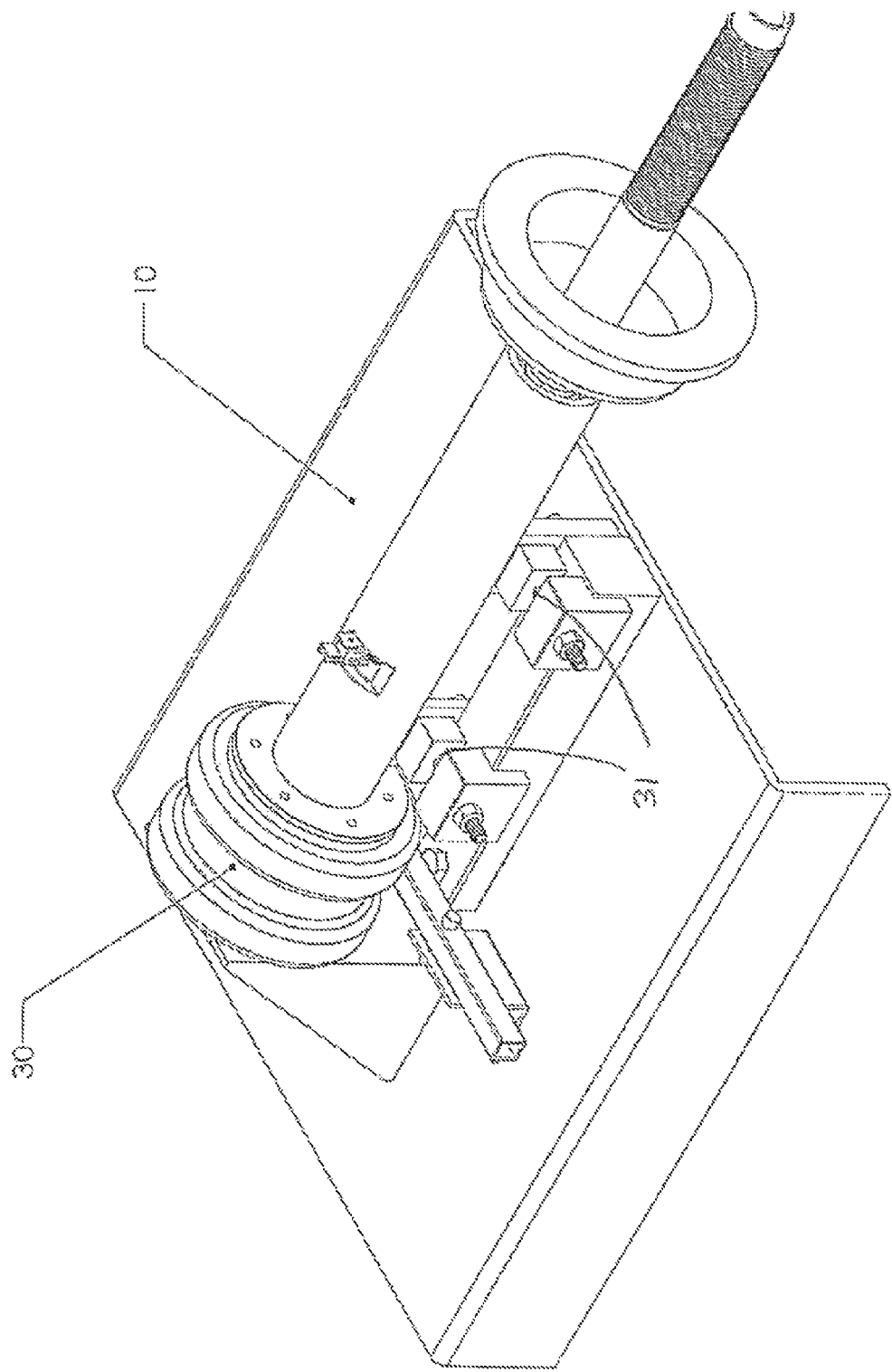
FIG. 1 represents an overall structure of the electro-magnetic disc drive balancer.
Figure 2:
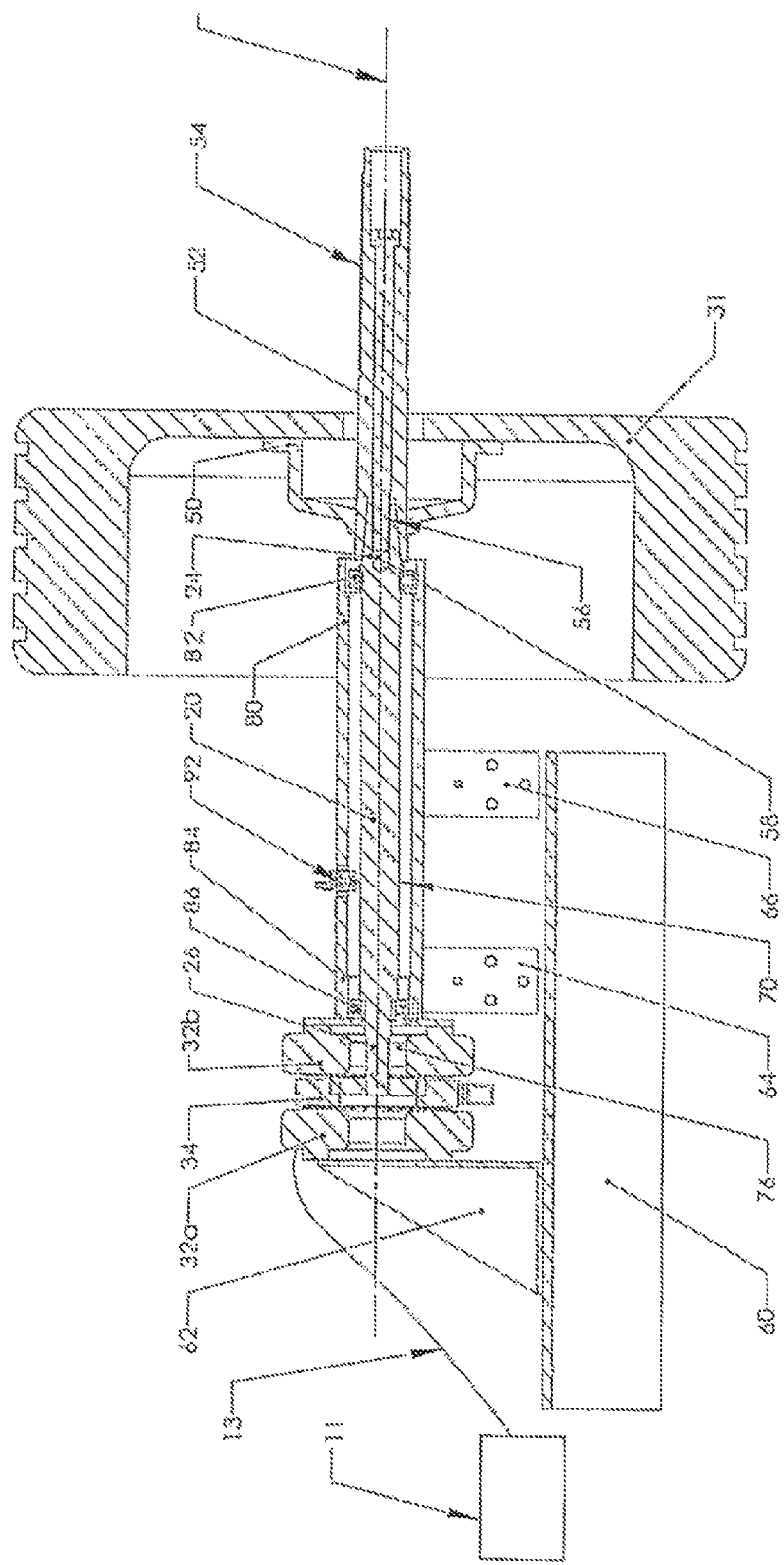
FIG. 2 is a cross-sectional view of the stator and rotor assembly structures of the electromagnetic disc drive referred to in FIG. 1.
Figure 3:
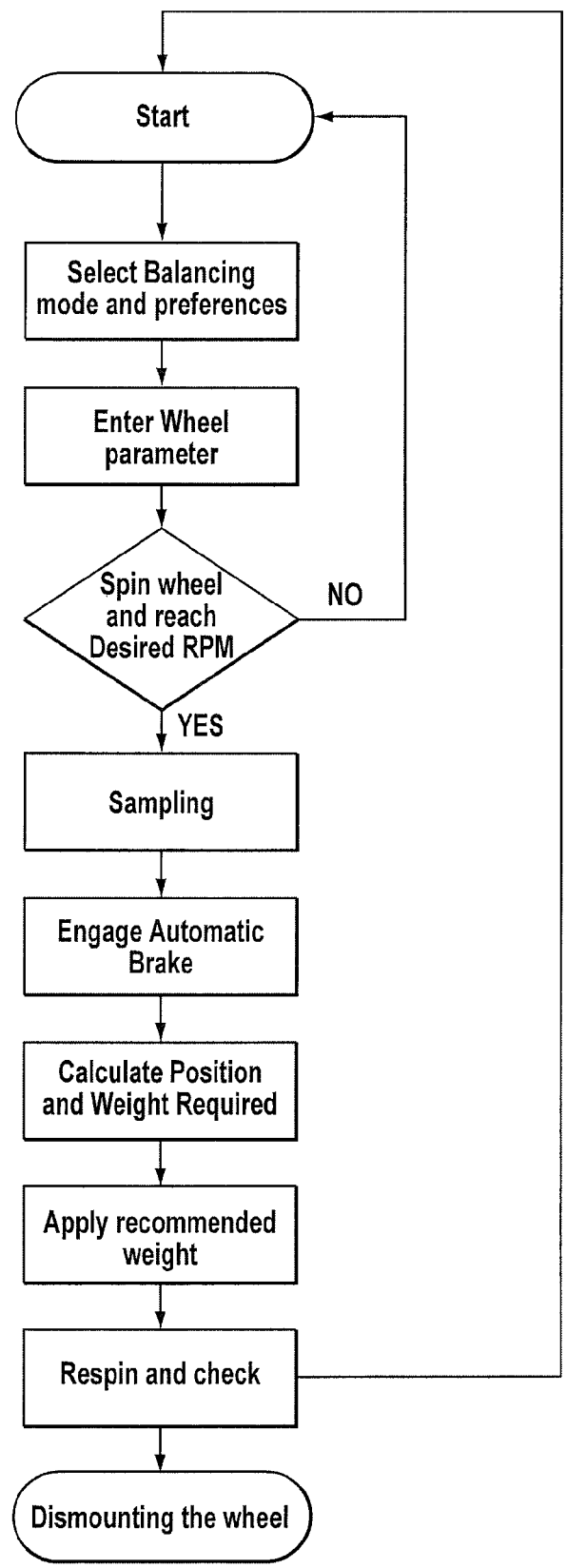
FIG. 3 is a balanced asset repair process flow chart of the above-mentioned electromagnetic disc drive balancer.
Figure 4:
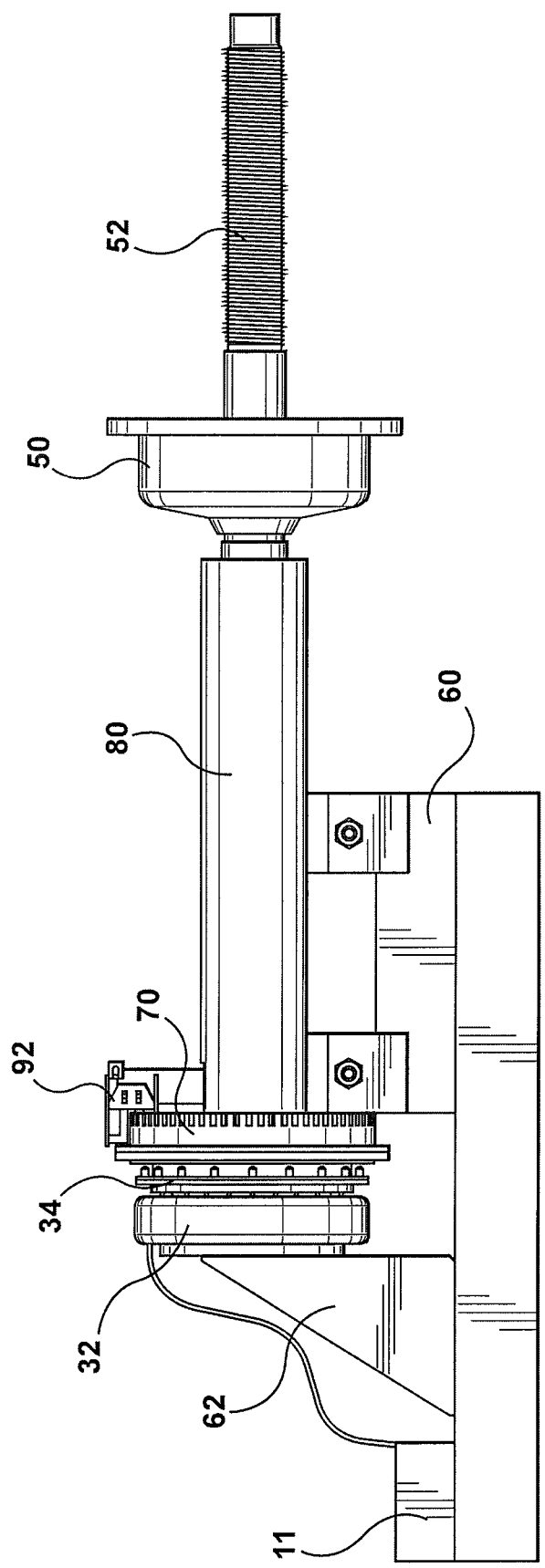
FIG. 4 is a side elevational view of FIG. 1.

FIGS. 1 and 2 and 4 illustrate the device 10 namely the magnetic or electromagnetic disc drive device, which comprises a shaft 20 having an axis of rotation 22. The shaft 20 presents one end 24 adapted to coaxially receive a disc or vehicle wheel 31 shown. Moreover, the shaft 20 includes an opposite end 26 which includes the electro-magnetic disc drive 30. The electro-magnetic disc drive means 30 includes a stator 32 and rotor means 34.

The stator means 32 electromagnetically drives the rotor means 34, shaft 20, disc 31 about the axis of rotation 22.

Furthermore, the device 10 includes means for determining the imbalance in the disc 31 in the manner well-known to those persons skilled in the art.

The device 10 also includes a flange 50 coaxially disposed about the axis of rotation 22 and adapted to contact the disc or vehicle wheel 31 as shown. Furthermore, the one end 24 also includes a stub shaft 52 which can include threads 54 at one end thereof which are adapted to receive a locking mechanism (not shown) so as to sandwich the disc or vehicle wheel 31 between the flange 50 and the locking mechanism (not shown) in the manner well known to those person skilled in the art.

The stub shaft 54 coaxially engages and is connected in the one end 24 of the shaft 20 in a variety of means which can include the use of a threaded structure 56 at another end of the stub shaft that engages a threaded hole 58 presented at the first end 24 of the shaft 20 as shown.

The device 10 also includes a frame 60 having a bracket 62 for supporting the stator means 32 as shown in FIG. 2.

The stator means shown in the embodiment of FIGS. 1 and 2 includes a first and second stator 32a and 32b which are spaced apart. One of the stators 32b includes a hole 76 there through to axially rotatively receive the shaft 20 as shown.

The rotor means 34 is disposed between the first and second spaced stators 32a and 32b for axial rotation there between. In one embodiment, the rotor 34 is spaced from first and second stators 32a and 32b by a distance which is less than two millimetres. However, other spacing dimensions may be used.

The rotor 34 can be squirrel cage, solid steel, solid aluminium or other conductive material. One example of a squirrel cage consists of a structure which has an overall cylindrical shape mounted on a shaft in a manner well known to persons skilled in the art. Internally, the squirrel cage contains longitudinal conductive bars set in grooves and connected together at both ends by short rings forming a cage-like structure. The core of the rotor is built with stacks of electrical steel laminations.

The squirrel cage bars can be casting aluminium or other metal material.

The stator windings can be two, three or more phase and the poles can be two, four, six or more.

The device 10 also can include a hollow cylindrical housing or sleeve 80 which is supported by the frame 60 by means of brackets 64 and 66 that engage the outer periphery of the housing 80 as shown in FIG. 2. The housing 80 is adapted to coaxially receive the rotating shaft 20. In particular, one end of the housing 80 includes bearing 82 that support the one end 24 of the rotating shaft 20 while a second end 84 of the housing includes bearing 86 for rotationally supporting the shaft 20. Moreover, the second end 84 of housing 80 is connected to the second stator 32b as shown.

The rotor 34 can be connected to the second end of the shaft 26 by a variety of means which includes bonding, fasteners, spleens, friction fit or the like.

In one embodiment of the invention, the power unit 11 by means of cable 13 energizes the stator means 32 so as to generate a fluctuating rotating electro-magnetic field which induces rotation of the rotor 34 causing the shaft 20 to rotate along with the stub shaft 54, flange 50 and disc or vehicle wheel 31.

In one embodiment of the invention, the rotating shaft 20 includes a code wheel 70 disposed along the outer periphery of the rotating shaft 20 that engages an encoder 92 presented by the housing 80. The encoder 92 and code wheel 70 generate as signal which is received by the processor means to display the imbalance of the disc or vehicle wheel 31 as it rotates, In this way the invention described provides means responsive to the rotation of the vehicle wheel for measuring and indicating the imbalance of the rotating wheel.

Accordingly, the power supply 11 connects to the stator means 32 via a cable 13. The stator means 32 generate an axial alternating magnetic field when passing frequency alternating current. The rotor 34 rotates under the force of rotation magnetic field and promotes the rotary axis of the shaft 20 to rotate.

When one needs to brake the electromagnetic drives, the power supply unit (not shown) can, in one embodiment output DC current into the stator means 34 of the electromagnetic disc drives 30 so as to generate the braking force on the rotor means.

As previously described, the signal device includes a code wheel 90 and encoder 92 and one or more piezoelectric devices as shown.

The imbalance position can be determined after the balancer rotates at a specified RPM through the use of a code wheel 70 and encoder 92. The piezoelectric devices 31 generate an electronic signal under the imbalance force of the disc or vehicle wheel 31 as the balance or device 10 wheel 31 rotates. Furthermore, the encoder can transmit the signal to the power driven unit and determine the balance weight on the exact position of the imbalanced object.

Figure 5:
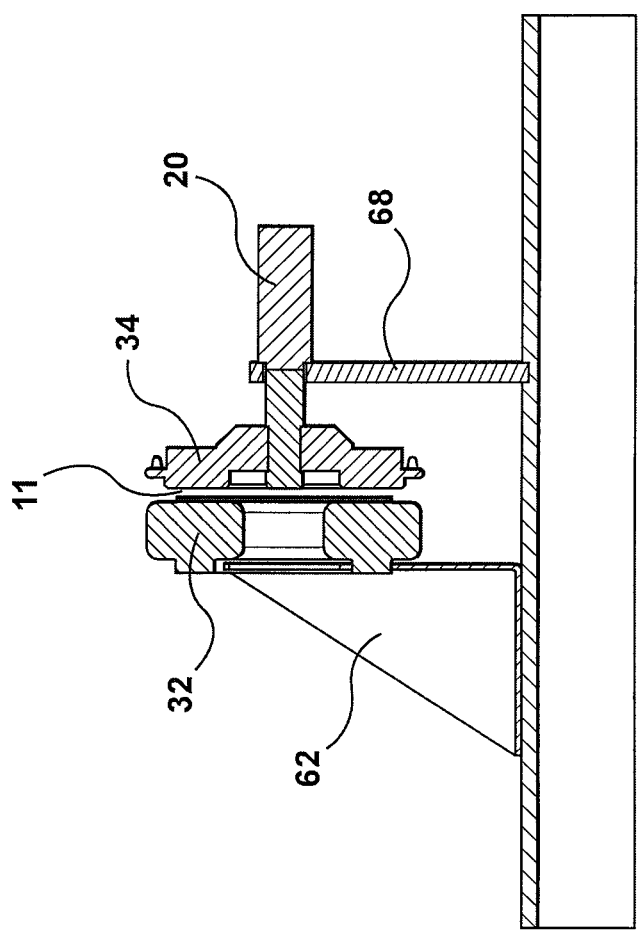
FIG. 5 is a cross-sectional view of another embodiment of the invention.

FIG. 5 illustrates another embodiment of the invention winch includes the use of one stator 32 rather than two and rotor 34. The stator 32 is supported by means of bracket 62 connected to the support 60 while the rotating shaft 20 is also supported by means of bearings 82 and 86 supported by the sleeve 80. FIG. 4 also shows the use of one rotor which can be connected to the other end 26 of the rotating shaft 20. FIG. 4 is a representation drawing concerning the concept of utilizing one stator.

The invention described herein relates also to a method for balancing a vehicle wheel 31 connected at one end 24 of a shaft 20 rotation about an axis 22 having a rotor 34 at the other end 26 of the shaft 20 comprising the steps of powering a stator 32 axially disposed adjacent the rotor 34 so as to electromechanically drive the rotor 34, shaft 20 and vehicle wheel 31 about the axis of rotation 22. The method further includes:
 (a) Rotating the vehicle wheel 31 about the axis of rotation 22 at a designated RPM;
 (b) Shutting the power at the designated RPM;
 (c) Measuring the imbalance of the rotating vehicle wheel 31 at the designated RPM;
 (d) Reengaging the power to brake the rotation of the vehicle wheel 31.

Furthermore, the method includes the steps of:
 (a) Applying the desired the weight to the vehicle 31 so as to correct the imbalance;
 (b) Reenergizing the power to the stator 32 to rotate the vehicle wheel 31 at the designated RPM so as to check said imbalance.

The imbalance is measured by data processing means receiving signals from the piezoelectric devices 31 associated with the rotating shaft 20 and encoded means associated with the rotating shaft.

The invention described herein illustrates that the balance test and repair process for balancing the disc comprises:
1. Install and fix the disc or object to be balanced on the stub shaft 54 and flange 50 of the balancer 10.
2. Input the imbalance objects with, diameter and distance between the object and machine.
3. Power supply 11 is activated to output alternating current to stator 2. Start the balancer 10 to rotate about axis 22. Shut down the power while the axis of rotation 22 rotates at the desired RPM. The disc continues to rotate based on inertia.

4. After the data is sampled and finished the power supply 11 is activated to output DC to stator 2 to brake the balancer 10.

5. The imbalance values and positions will be displayed after the wheel balancer 10 brakes.

Procedures identified above under paragraphs 3 to 5 are repeated after a weight is attached to the disc to retest the balance until the disc finally achieves substantial balance.

The invention as described herein is not limited to the embodiment described therein. Changes to the above-mentioned examples can be made and then the invention can be made and the invention is described in the following claims.

We claim:

1. A device to balance a disc, comprising:
   (a) a rotor
   (b ) a shaft extending solely from one side of the rotor and having one end adapted to coaxially receive the disc:
   a stator axially spaced from another side of the rotor and shaft to magnetically drive the rotor, shaft and disc about the axis; and
   (d) means for determining imbalance in the disc.

2. A device as claimed in claim 1 wherein the one end includes a flange coaxially disposed about the axis to contact the disc.

3. A device as claimed in claim 2 wherein the one end further includes a flange and coaxially engageable stub shaft.

4. A device as claimed in claim 3 wherein the disc comprises a vehicle wheel.

5. A device as claimed in claim 4 wherein the device includes a frame for supporting the stator and a hollow cylindrical housing supported by the frame for receiving said shaft; said first stator disposed to one side of the rotor.

6. A device as claimed in claim 5 wherein the stator comprises first and second spaced stators.

7. A device as claimed in claim 5 wherein the second stator has a hole there through to axial rotationally receive the shaft.

8. A device as claimed in claim 7 wherein the rotor is disposed between the first and second spaced stators for axial rotation there between.

9. A device as claimed in claim 8 wherein the rotor is spaced from the first and second stators and the space is less than 2 millimetres.

10. A device as claimed in claim 9 wherein the determining means comprises piezoelectric devices to generate a signal in response to the imbalance.

11. A device as claimed in claim 10 wherein said detecting means further comprises a code wheel and an encoder.

12. A device as claimed in claim 11 wherein the detecting means comprises a data processing means for processing the signal in response to the imbalance.

13. A balancer for a wheel comprising
    (a) a frame
    (b) a hollow cylindrical housing supported by the frame;
    (c) a rotor
    (d) at least one stator supported by the frame
    (e) a shaft extending solely from one side of the rotor and having a distal end to coaxially receive the wheel
    (f) a stub shaft coaxial presented at the distal end for removable connection to the wheel
    (g) the stator axially spaced from another side of the rotor;
    (h) power means associated with the stator to generate an electromagnetic field between the stator and the rotor to rotate the shaft and wheel;
    (i) means responsive to the rotation of the wheel for measuring and indicating imbalance of the rotating wheel.

14. A balancer as claimed in claim 13 further including a hollow cylindrical housing supported by said frame to coaxially rotationally receive the shaft.

15. A balancer as claimed in claim 14 wherein the stator comprises one stator, and the rotor comprises one rotor at the second end of the shaft, the rotor spaced from the one stator by a distance less than 2 millimetres.

16. A balancer as claimed in claim 14 wherein the balancer comprises two spaced stators where one of the stators is spaced from and axially disposed from the other side of the rotor and the second stator includes a hole for rotationally receive the shaft, and the rotator comprises a rotor spaced between the two spaced stators.

17. A method for balancing a vehicle wheel connected at one end of a shaft rotating about an axis and having a rotor at the other end of said shaft comprising the steps of:
    (a) axially placing the rotor and shaft solely to one side of a stator
    (b) powering the stator so as to electromechanically drive the rotor, shaft and vehicle wheel about the axis of rotation.

18. A method as claimed in claim 17 further including:
    (a) rotating the vehicle wheel about the axis of rotation at a designated RPM
    (b) shutting the power at said designated RPM
    (c) measuring the imbalance of said rotating vehicle wheel at the designated RPM
    (d) reengaging the powering step to brake the rotation of the vehicle wheel.

19. A method as claimed in claim 18 further including steps of:
    (a) applying the desired weight to the vehicle wheel so as to correct the imbalance;
    (b) reenergizing the powering to the stator to rotate the vehicle wheel at the designated RPM so a to check the imbalance.

20. A method as claimed in claim 19 wherein the imbalance is measured by data processing means receiving signals from piezoelectric devices associated with the rotating shaft.

* * * * *